US 9,110,856 B2

(12) United States Patent
Tsurumi et al.

(10) Patent No.: US 9,110,856 B2
(45) Date of Patent: Aug. 18, 2015

(54) INTERFACE CONTROL APPARATUS, DATA STORAGE APPARATUS AND METHOD FOR INTERFACE CONTROL

(71) Applicant: KABUSHIKI KAISHA TOSHIBA, Tokyo (JP)

(72) Inventors: Hiroshi Tsurumi, Kawasaki (JP); Hidetoshi Koike, Kodaira (JP); Nobuaki Yoshitake, Kawasaki (JP); Tomoo Utsumi, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/921,538

(22) Filed: Jun. 19, 2013

(65) Prior Publication Data

US 2014/0207980 A1    Jul. 24, 2014

(30) Foreign Application Priority Data

Jan. 23, 2013  (JP) ................................. 2013-010076

(51) Int. Cl.
*G06F 5/00* (2006.01)
*G06F 13/16* (2006.01)
*G06F 13/00* (2006.01)

(52) U.S. Cl.
CPC .................. *G06F 13/1642* (2013.01)

(58) Field of Classification Search
None
See application file for complete search history.

(56) References Cited

U.S. PATENT DOCUMENTS

2005/0228947 A1* 10/2005 Morita et al. ................. 711/114
2007/0041385 A1   2/2007 Sali et al.
2010/0318825 A1* 12/2010 Fulkerson et al. ............ 713/323

FOREIGN PATENT DOCUMENTS

| JP | 2002-158678 A | 5/2002 |
| JP | 2004-054419 A | 2/2004 |
| JP | 2006-273261 A | 10/2006 |
| JP | 2012-054955 A | 3/2012 |

* cited by examiner

*Primary Examiner* — Scott Sun
(74) *Attorney, Agent, or Firm* — Knobbe Martens Olson & Bear LLP

(57) ABSTRACT

According to one embodiment, an interface control apparatus includes an interface, and a controller. The interface is configured to transmit information between a host and a data storage apparatus. The controller is configured to fetch request information making a processing request for the data storage apparatus, from an element being a storage unit of a queue provided on the host through the interface. The controller is configured to execute read request processing of fetching first request information divided into a plurality of elements and stored, with priority over second request information which is different from the first request information, when the request information is fetched.

14 Claims, 6 Drawing Sheets

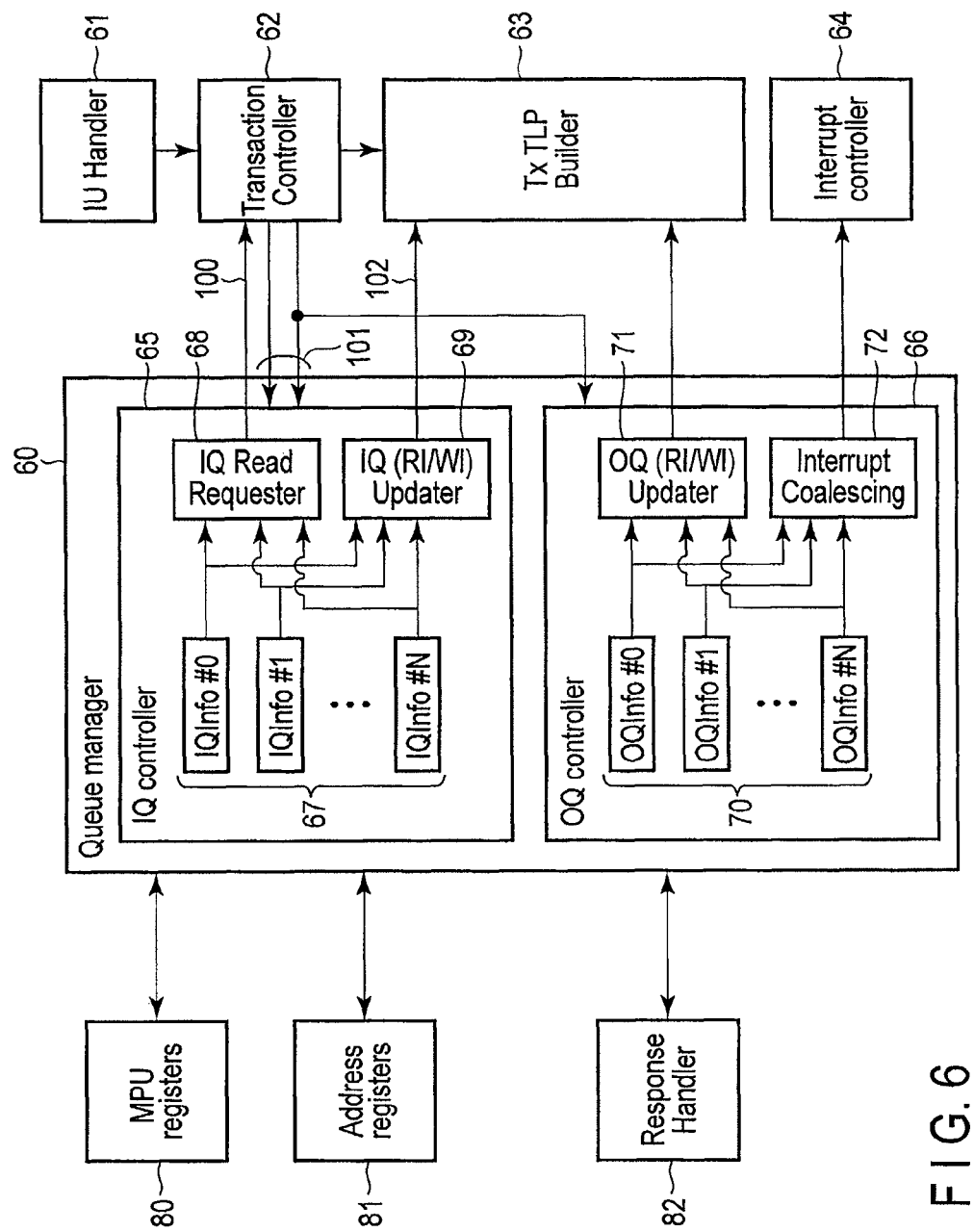
F I G. 6

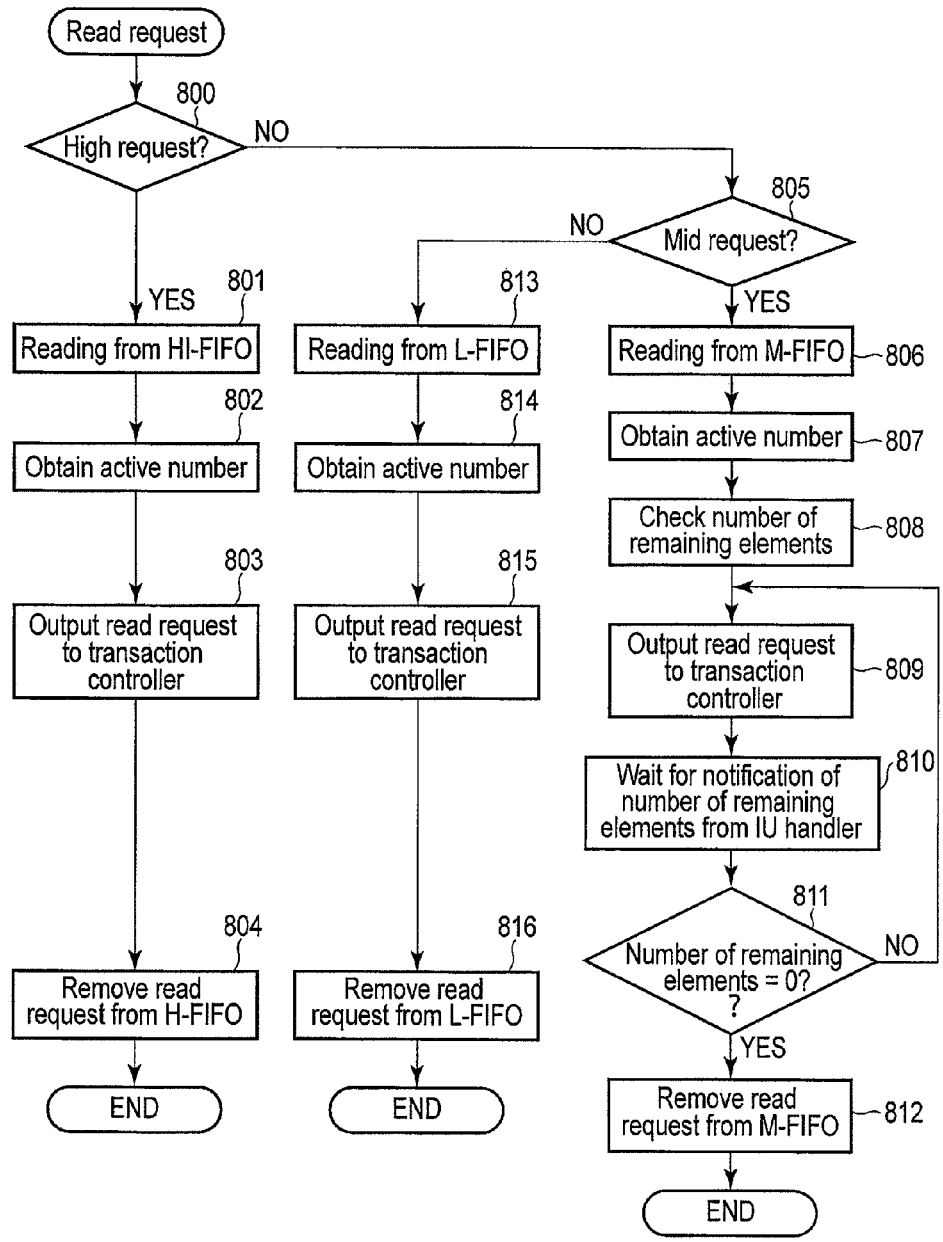
F I G. 8

INTERFACE CONTROL APPARATUS, DATA STORAGE APPARATUS AND METHOD FOR INTERFACE CONTROL

CROSS-REFERENCE TO RELATED APPLICATIONS

This application is based upon and claims the benefit of priority from Japanese Patent Application No. 2013-010076, filed Jan. 23, 2013, the entire contents of which are incorporated herein by reference.

FIELD

Embodiments described herein relate generally to an interface control apparatus which controls an interface between a host and a data storage apparatus, a data storage apparatus, and a method for interface control.

BACKGROUND

Nowadays, the SCSI over PCI Express (SOP) standard, obtained by mapping the SCSI standard over PCI Express (Registered Trademark, hereinafter referred to as "PCIe"), has been presented as interface between a host and a data storage apparatus (storage device).

As a characteristic of the interface standard like this, a plurality of queues configured to queue request information to request processing for a command or a task and response information from the storage device are allocated on the host side. In addition, an interface control specification for controlling the queues on the storage device side is implemented.

The request information and response information which are stored in the queues are also referred to as information units (IUs), and referred to as request IUs and response IUs, respectively. The information unit may be stored as one element, or divided into a plurality of elements and stored in the queue. The term "element" indicates a storage unit of the queues which store the information units.

When request information which are divided into a plurality of elements and stored in the queue is issued to the storage device (specifically, when the storage device fetches the request information), part of the divided elements may stay in the queue when the request information is transmitted by unit of element. When such a situation occurs, the storage device cannot process the request information until all the elements are transmitted, and thus the processing efficiency decreases.

BRIEF DESCRIPTION OF THE DRAWINGS

FIG. 6 is a block diagram explaining a structure of an interface controller according to the embodiment;

FIG. 8 is a flowchart explaining read request processing for the information unit according to the embodiment.

DETAILED DESCRIPTION

In general, according to one embodiment, an interface control apparatus includes an interface, and a controller. The interface is configured to transmit information between a host and a data storage apparatus. The controller is configured to fetch request information making a processing request for the data storage apparatus, from an element being a storage unit of a queue provided on the host through the interface. The controller is configured to execute read request processing of fetching first request information divided into a plurality of elements and stored, with priority over second request information which is different from the first request information, when the request information is fetched.

Various embodiments will be described hereinafter with reference to the accompanying drawings.

[System Configuration]

Figure 1:
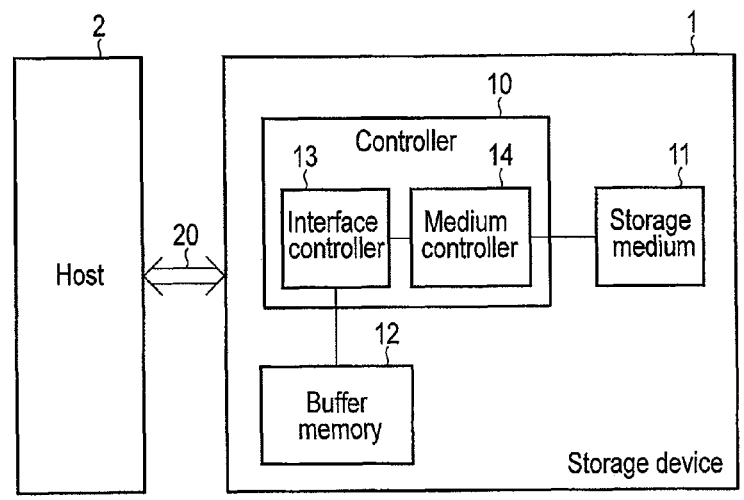
FIG. 1 is a block diagram explaining a system configuration according to an embodiment.

FIG. 1 is a block diagram for explaining a system configuration according to the present embodiment. As illustrated in FIG. 1, according to the present embodiment, a storage device (data storage apparatus) 1 and a host 2 are connected by an interface bus 20 of, for example, the PCIe standard. The storage device 1 is, for example, a hard disk drive (HDD), a solid-state drive (SSD), or a hybrid HDD. The HDD includes disks as a storage medium 11 described later. The SSD includes flash memories as a storage medium 11 described later. The hybrid HDD includes disks and flash memories as the storage medium 11.

The storage device 1 includes a controller 10, storage medium 11, and a buffer memory 12. The controller 10 includes an interface controller 13, and a medium controller 14. In the present embodiment, the interface controller 13 is a transmission controller, which is connected with the host 2 through the interface bus 20 and controls transmission of request information (request IU) and response information (response IU) as described later. The medium controller 14 is a read/write controller which controls data read processing or data write processing for the storage medium 11, in cooperation with the interface controller 13. The buffer memory 12 is a memory which stores information under the control of the interface controller 13.

Figure 2:
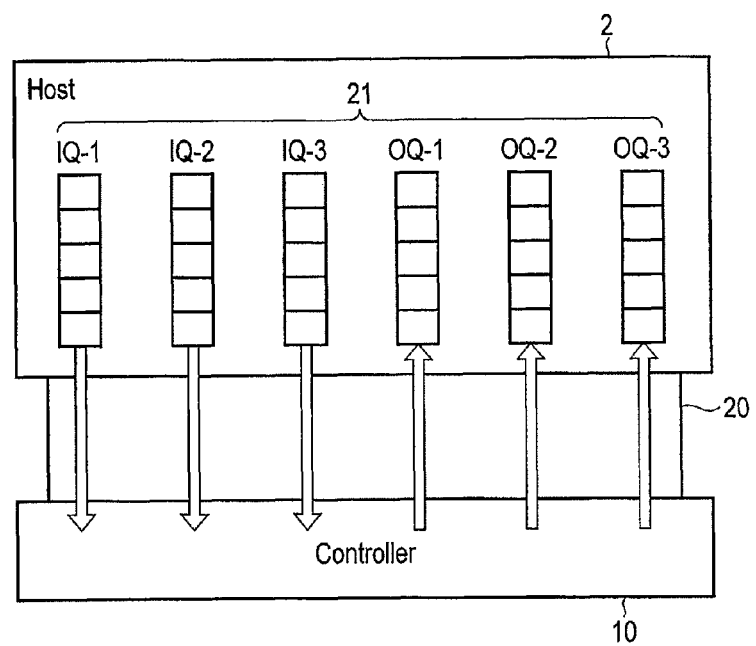
FIG. 2 is a schematic diagram explaining an interface structure according to the embodiment.

FIG. 2 is a schematic diagram for explaining an interface structure between the storage device 1 and the host 2 in the present embodiment. As illustrated in FIG. 2, the host 2 has an interface structure including a plurality of queue sets 21. Each queue set 21 includes a plurality of queues (inbound queue [IQ]) IQ-1 to IQ-3 configured to perform queuing to issue request information for a command or a task to the storage device 1. Each queue set 21 also includes a plurality of queues (outbound queue [OQ]) OQ-1 to OQ-3 configured to temporarily queue response information (response IU) transmitted from the storage device 1.

The controller 10 of the storage device 1 fetches request information (request IU) from each of queues IQ-1 to IQ-3 of the host 2 through the interface bus 20. When the controller 10 makes a response, the controller 10 stores response information (response IU) in queues OQ-1 to OQ-3 of the host 2 through the interface bus 20.

Figure 3A:
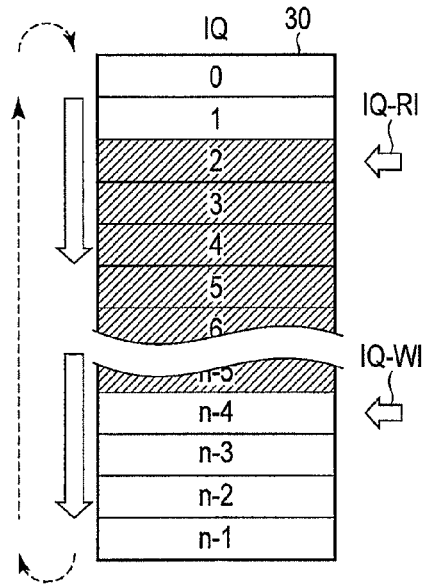
FIG. 3A and FIG. 3B are diagrams explaining structures of queues according to the embodiment.
Figure 3B:
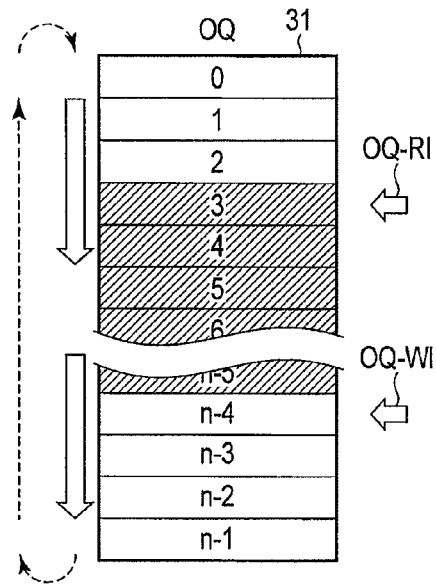

FIG. 3A and FIG. 3B are diagrams for explaining structures of the queues provided in the host 2. FIG. 3A illustrates a queue (IQ) 30 which stores request information (request IU). FIG. 3B illustrates a queue (OQ) 31 which stores response information (response IU).

As illustrated in FIG. 3A and FIG. 3B, an information unit (IU) is stored in, and fetched, each of queues 30 and 31. An information unit is stored in and fetched from a unit called elements (0 to n-1). Storage (addition) and reading of the information unit in and from each of queues 30 and 31 are controlled by using two pointers, that is, a write pointer (write index [WI]) and a read pointer (read index [RI]).

As illustrated in FIG. 3A, when the host 2 issues request information (request IU) for a command or a task, the host 2 stores a request IU in elements indicated by the writer pointer IQ-WI in queue (IQ) 30. The host 2 advances the writer pointer IQ-WI by the number of elements that store the request IU. On the other hand, the controller 10 of the storage device 1 fetches the request IU from elements indicated by the read pointer IQ-RI in queue (IQ) 30. The controller 10 advances the read pointer IQ-RI by the number of elements, from which the request IU has been fetched.

In addition, as illustrated in FIG. 3B, when the controller 10 of the storage device 1 transmits response information (response IU) in return, the controller 10 stores a response IU in elements indicated by the writer pointer OQ-WI in queue (0Q) 31. The controller 10 advances the writer pointer OQ-WI by the number of elements that store the response IU. On the other hand, the host 2 takes out the response IU from the elements indicated by the read pointer OQ-RI in queue (OQ) 31. The host 2 advances the read pointer OQ-RI by the number of elements, from which the response IU has been fetched.

Figure 4A:
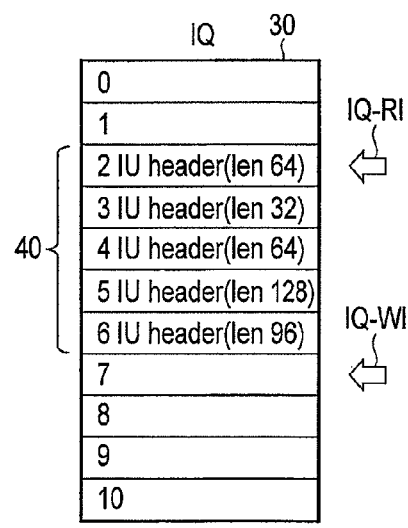
FIG. 4A and FIG. 4B are diagrams explaining a storage specification for information units according to the embodiment.
Figure 4B:
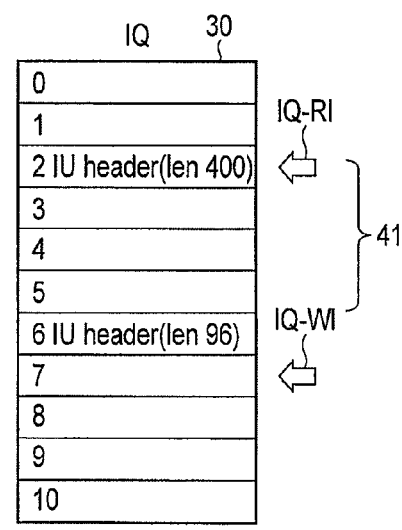

FIG. 4A and FIG. 4B are diagrams for explaining a storage specification of a request IU stored in queue (IQ) 30. FIG. 4A is a diagram illustrating a specification in which one request IU 40 is stored in each element in queue (IQ) 30. FIG. 4B is a diagram illustrating a specification in which one request IU is stored over a plurality of elements 41 (four elements in this example). In short, as illustrated in FIG. 4B, an IU which is divided and stored in a plurality of elements is called a "spanned IU". On the other hand, as illustrated in FIG. 4A, an IU which is stored in each element is called a "non-spanned IU".

Figure 5:
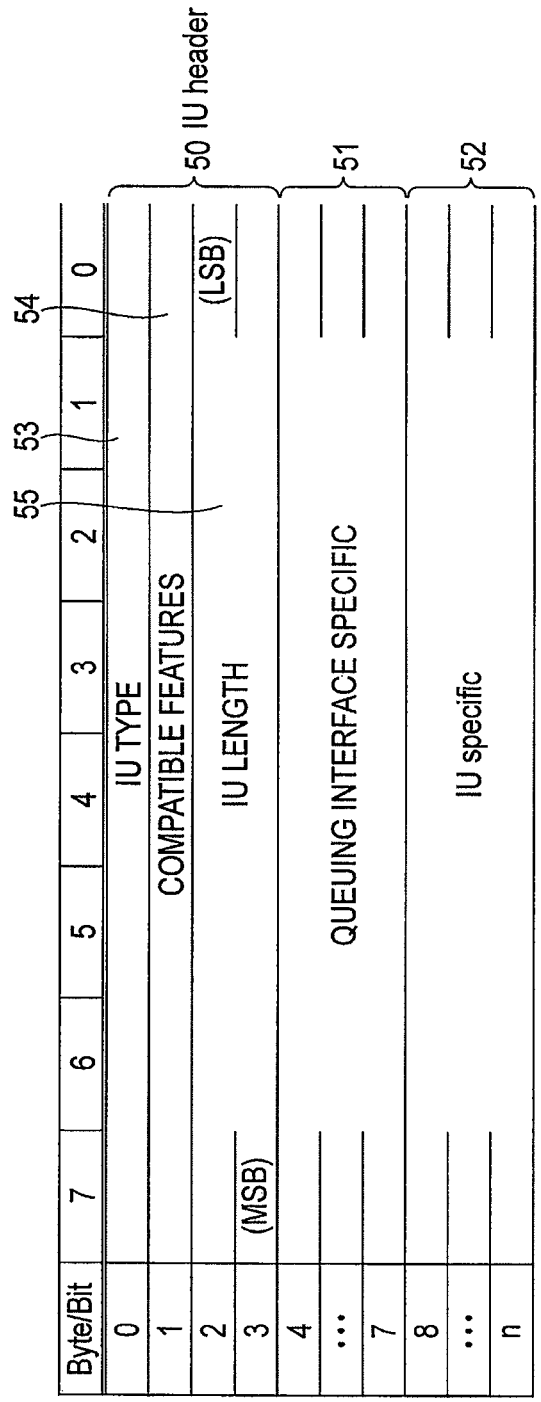
FIG. 5 is a diagram explaining a format of the information unit according to the embodiment.

FIG. 5 is a diagram for explaining an outline of a format of the request IU. The format is compliant with, for example, the SOP standard or the PCI Express Queuing Interface (PQI) standard.

As illustrated in FIG. 5, the format includes an IU header 50, a queuing interface specific part 51, and an IU specific part 52. For example, OQ-ID information for identifying the OQ, to which a response IU used for response to the request IU is transmitted, is set in the queuing interface specific part 51. For example, the type of commands (such as read/write commands) of the SCSI standard is set in the IU specific part 52.

The IU header 50 includes an IU type part 53, a compatible feature part 54, and an IU length 55. The type of request information for a command and a task from the host 2, is set in the IU type part 53. The compatible feature module 54 is a field which is ignored in the current standard. Information which indicates the data length of the IU is set in the IU length 55.

As described above, the controller 10 of the storage device 1 fetches a request IU from the element(s) indicated by the read pointer IQ-RI in queue (IQ) 30. In the present embodiment, the controller 10 checks the number of elements which store the request IU. Specifically, the controller 10 checks whether the request IU is a spanned IU which is divided into a plurality of elements and stored in the IQ 30, as illustrated in FIG. 4B. Specifically, the controller 10 reads elements of a desired number, including the head of the request IU, from the IQ 30, and checks the IU type part 53 and the information set in the IU length 55 in the IU header 50 included in the head element. Thereby, the controller 10 can determine whether the IU is a spanned IU or not.

When the controller 10 sends a response IU in return for the request IU fetched from the IQ 30, the controller 10 identifies the OQ 31, based on the OQ-ID information set in the queuing interface specific part 51 of the IU header 50. The host 2 fetches the response IU from queue (OQ) 31.

Next, FIG. 6 is a diagram illustrating a main part of the interface controller 13 included in the controller 10. In the present embodiment, the interface controller 13 has a structure of including a module referred to as queue manager 60.

As illustrated in FIG. 6, the queue manager 60 includes an IQ controller 65 and an OQ controller 66, and manages the state of each of queues IQ (IQ-1 to IQ-3) and OQ (OQ-1 to OQ-3) of the host 2. Thereafter, each queue is referred to as each IQ or each OQ for convenience' sake.

The IQ controller 65 includes a register 67 which holds information (OQInfo #0 to #N) which indicate the storage states of the respective IQs, an IQ read requester 68, and an IQ pointer updater (IQ(RI/WI) updater) 69. The register 67 stores the write pointer IQ-WI and the read pointer IQ-RI of each IQ. The IQ read requester 68 arbitrates read requests of the request IUs stored in the IQs. The IQ pointer updater 69 updates the read pointer IQ-RI and the write pointer IQ-WI of each IQ.

On the other hand, the OQ controller 66 includes a register 70 which holds information (OQInfo #0 to #N) which indicate the storage states of the respective OQs, an OQ pointer updater (OQ(RI/WI) updater) 71, and an interrupt coalescing module 72. The register 70 stores the write pointer OQ-WI and the read pointer OQ-RI of each OQ. Since the present embodiment relates to the IQ controller 65, specific explanation of the OQ controller 66 is omitted.

In addition, as illustrated in FIG. 6, the peripheral devices of the queue manager 60 include an IU handler 61, a transaction controller 62, a TLP builder 63, and an MSI-X interrupt controller 64. The term "MSI-X" indicates interrupt processing provided by the PCIe standard.

In addition, the peripheral devices of the queue manager 60 include registers 80 which can be accessed by the medium controller 14, base address registers (BAR) 81 on the interface (PCIe) on the host 2, and a response handler 82.

The response handler 82 requests the TLP builder 63 to transmit a response IU to make a response after the request is executed, and stores the response IU in the OQ of the host 2. The response handler 82 also instructs the OQ controller 66 to update the write pointer OQ-WI. The MSI-X Interrupt controller 64 notifies execution of MSI-X interrupt processing for the host 2 and storage of the response IU, by an instruction from the interrupt coalescing module 72. The registers 80 are registers configured to control the respective blocks. The base address registers 81 are registers which can be accessed from the host 2 through the interface (PCIe).

The IU handler 61 checks the IU header 50 of the request IU obtained from each IQ. The transaction controller 62 makes a read request to the TLP builder 63 to obtain the request IU from each IQ on the host 2. The TLP builder 63 builds transaction layer (TL) packets (TLPs) to request transmission of the request IU through the interface bus 20, in response to a read request from the transaction controller 62.

Processing for obtaining the request IU by the controller 10 of the storage device 1 will be explained hereinafter with reference to FIG. 6.

After the host 2 stores a request IU in any IQ, the write pointer IQ-WI in the register 67 of the storage device 1 is updated through the interface bus 20. Next, the IQ controller 65 refers to the register 67, checks a difference between the write pointer IQ-WI and the read pointer IQ-RI of each IQ, and recognizes that the request IU is stored in any IQ. When the difference occurs, the IQ read requester 68 outputs a read request (REQ signal) 100 to the transaction controller 62, to read the request IU from the IQ.

The TLP builder 63 builds TL packets for a request to transmit the request IU, and issues the TL packets onto the interface bus 20, in response to the read request from the transaction controller 62. In this case, the TLP builder 63 receives a newest IQ read pointer (IQ-RI) 102 from the read pointer updater 69, and issues TL packets (TLPs) for making a read request from the read pointer 102 to the host 2.

By the above processing, the controller 10 reads the request IU for the desired number of elements from the IQ, through the interface bus 20. The transaction controller 62 outputs an update value 101 of the read pointer (IQ-RI) of each IO, which is obtained by advancing the read pointer by the number of read elements, to the IQ controller 65. The read pointer updater 69 sets the update value 101.

On the other hand, the host 2 transmits (in return) the processed TL packets (completion TLP) including data of the request IU read from the IQ, through the interface bus 20, in response to the read request (TL packets) from the controller 10. As described above, the IU handler 61 analyzes the IU header 50 of the transmitted request IU, and checks whether the request IU is completed by the number of elements read from the IQ. Specifically, the IU handler 61 checks whether the request IU is divided into a plurality of elements and stored in the IQ, as illustrated in FIG. 4B.

When the request IU is formed of one element or the request IU is completed by the number of obtained elements, the controller 10 (actually the interface controller 13) transmits the request IU to a host request processor. The host request processor is a command processor which analyzes and executes a request (specifically, a data read/write command for the storage medium 11) from the host 2. In the embodiment, the host request processor is a medium controller 14 included in the controller 10.

When the request IU is not completed by the obtained elements, the controller 10 cannot transmit the request IU to the host request processor until all the elements which complete the request IU are obtained. In this state, the command processing for the request IU stored in the IQ of the host 2 is retarded.

Thus, the IQ controller 65 of the present embodiment executes processing for obtaining the succeeding elements of the request IU, with priority over obtaining of elements of the other IQs, by the IQ read request 68. The processing will be specifically explained hereinafter, with reference to FIG. 7 and FIG. 8.

Figure 7:
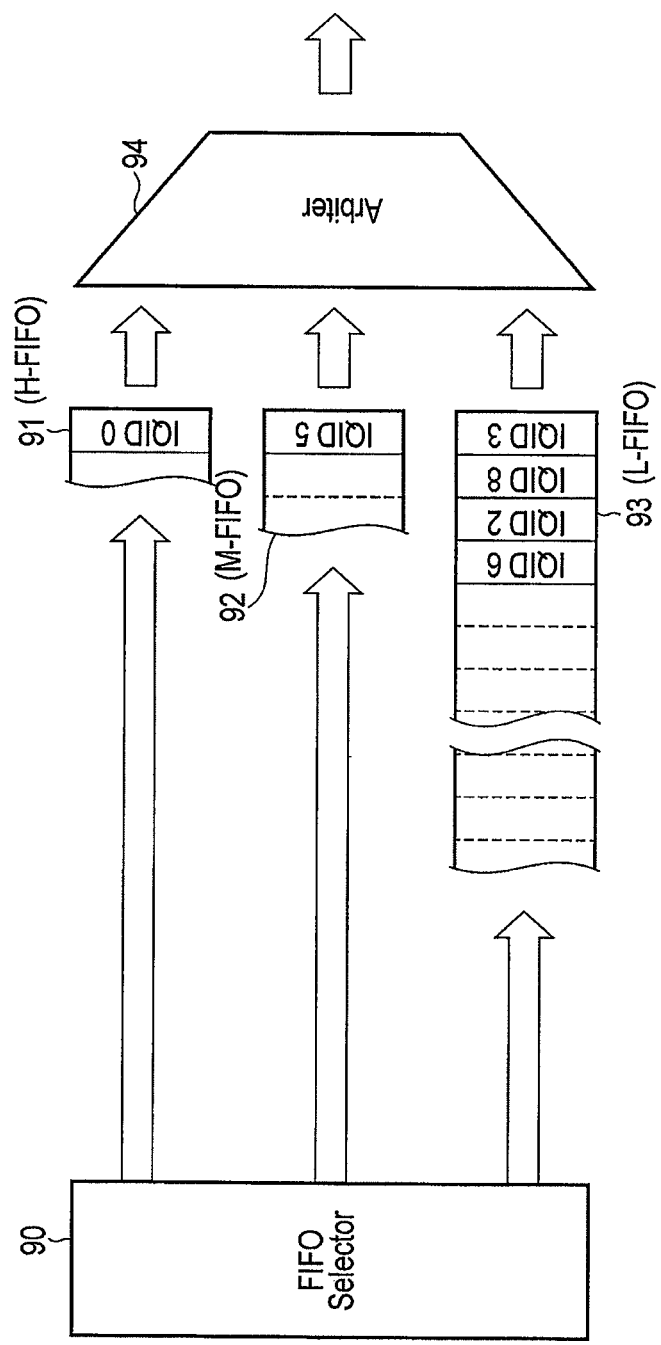
FIG. 7 is a diagram explaining a structure of an IQ read requester according to the embodiment.

As illustrated in FIG. 7, the IQ read requester 68 includes a first-in first-out (FIFO) selector 90, three types of FIFOs 91 to 93, and an arbiter 94 configured to arbitrate transmission. The FIFO selector 90 selects one of FIFOs 91 to 93 of the three types. FIFOs 91 to 93 of the three types are, for example, FIFO buffers including a high-priority FIFO (H-FIFO) 91 for administrator IQs of the PQI standard, a mid-priority FIFO (M-FIFO) 92, and a low-priority FIFO (L-FIFO) 93.

Next, operation of the IQ read requester 68 will be explained hereinafter with reference to the flowchart of FIG. 8.

When a read request (REQ) is generated, suppose that the read request (including IQ identification information IQID-n) is held in at least one of FIFOs 91 to 93 in the IQ read requester 68. The IQ read requester 68 determines whether the read request to read a request IU from the IQ is, for example, a high-priority read request (high request) for the administrator IQ of the PQI standard (Block 800). In the present embodiment, the processing for high-priority read requests is not directly related to the processing of obtaining a request IU divided into a plurality of elements, and thus may be omitted.

When the read request is a high request (YES in Block 800), the IQ read requester 68 reads IQID-0 of the read request from the H-FIFO 91 selected by the FIFO selector 90 (Block 801). In this case, the arbiter 94 selects the H-FIFO 91 with priority, and thereby the read request (IQID-0) is read from the H-FIFO 91.

In addition, the IQ read requester 68 obtains the active number (the number of effective elements) of the IQID-0 of the read request (Block 802). In this case, as illustrated in FIG. 3A, the IQ read requester 68 also checks the number of elements considering wrap around of the IQ. Next, as described above, the IQ read requester 68 outputs the read request (REQ signal) 100 to the transaction controller 62 (Block 803). The outputted read request 100 includes the IQID-0 and the active number.

When the transaction controller 62 receives the read request (REQ signal) 100, the transaction controller 62 transmits an acknowledgement signal (ACK signal) to the IQ read requester 68 in return. At this point in time, the IQ read requester 68 transmits the read request (IQID-0) from the H-FIFO 91, and removes the read request (IQID-0) from the H-FIFO 91 (Block 804).

On the other hand, in the present embodiment, when the read request is a spanned IU, the M-FIFO 902 holds the read request (the IQID-n of the IQ is IQID-5 in this example) of the remaining elements which have not yet been obtained in the elements to be obtained. The spanned IU is, for example, a request IU which is divided into four elements, as illustrated in FIG. 4B. The L-FIFO 93 holds a read request other than the read requests of the H-FIFO 91 or the M-FIFO 92.

When the read request is not a high request (NO in Block 800), the IQ read requester 68 determines that the read request is not a mid request, that is, the read request is a low request (NO in Block 805), except for the case that the read request is a request for the remaining elements of the spanned IU, as described later. Specifically, the IQ read requester 68 reads a read request (IQID-3) from the L-FIFO 93 selected by the FIFO selector 90 (Block 813). The IQ read requester 68 also obtains the active number (the number of effective elements) of the IQID-3 of the read request (Block 814). As described above, the IQ read requester 68 also checks the number of elements considering wrap around of the IQ.

Next, the IQ read requester 68 outputs the read request (REQ signal) 100 to the transaction controller 62 (Block 815). When the transaction controller 62 receives the read request (REQ signal) 100, the transaction controller 62 transmits an acknowledgement signal (ACK signal) to the IQ read requester 68 in return. At this point in time, the IQ read requester 68 transmits the read request (IQID-3) from the L-FIFO 93, and removes the read request (IQID-3) from the L-FIFO 93 (Block 816).

In the present embodiment, when the read request is not a high request (NO in Block 800) but is held in the M-FIFO 92, the IQ read requester 68 causes the arbiter 94 to execute priority arbitration over the L-FIFO 93 (YES in Block 805). As described above, the M-FIFO 92 holds the read request (IQID-5) of the remaining elements which have not been obtained in the elements to be obtained for the spanned IU.

The IQ read requester 68 reads the read request (IQID-5) from the M-FIFO 92 selected by the FIFO selector 90 (Block 806). The IQ read requester 68 also obtains the active number (the number of effective elements) of the IQID-5 of the read request (Block 807). As described above, the IQ read requester 68 also checks the number of elements considering wrap around of the IQ. The IQ read requester 68 checks the number of the remaining elements, based on the read pointer IQ-RI held in the register 67 (Block 808).

Next, the IQ read requester 68 outputs the read request (REQ signal) 100 to the transaction controller 62 (Block 809). When the transaction controller 62 receives the read request (REQ signal) 100, the transaction controller 62 transmits an acknowledgement signal (ACK signal) to the IQ read requester 68.

Then, as described above, the TLP builder 63 builds TL packets for a request to transmit the request IU, and issues the TL packets onto the interface bus 20, in response to the read request from the transaction controller 62. The host 2 transmits (transmits in return) the processed TL packets (completion TLP) including data (data of the remaining elements in this processing) of the request IU read from the IQ, through the interface bus 20, in response to the read request (TL packets).

The IU handler 61 on the controller 10 analyzes the IU header 50 of the transmitted request IU, checks whether the request IU is completed by the number of elements read from the IQ, and notifies the IQ read requester 68 of the number of the remaining elements. Specifically, the IQ read requester 68 receives notification of the number of the remaining elements from the IU handler 61 (Block 810), and determines whether the request IU is completed by the obtained elements, that is, whether the number of the remaining elements is zero or not (Block 811). When the number of the remaining elements is zero (YES in Block 811), the IQ read requester 68 removes the read request (IQID-5) from the M-FIFO 92 (Block 812). In addition, the interface controller 13 transmits the request IU to the medium controller 14 serving as the host request processor.

On the other hand, when the request IU is not completed by the read elements (NO in Block 811), the IQ read requester 68 repeats output of the read request to the transaction controller 62, until the number of the remaining elements is reduced to zero (Block 809). When the number of the remaining elements notified from the IU handler 61 is reduced to zero (Block 810, YES in Block 811), the IQ read requester 68 removes the read request (IQID-5) from the M-FIFO 92 (Block 812).

When the request IU is a spanned IU, the interface controller 13 transmits the request IU which has been completed by obtaining all the elements of the active number to the medium controller 14 serving as the host request processor. Thereby, the medium controller 14 executes command processing based on the spanned IU.

The read request processing for the spanned IU may be processing as follows. Specifically, after a request to read the remaining elements is stored in the M-FIFO 92, the IQ read requester 68 temporarily transmits the read request from the M-FIFO 92. Thereafter, the IQ read requester 68 requests the transaction controller 62 to issue read request TL packets for the remaining elements from the TLP builder 63. The IQ read requester 68 stores the read request again in the M-FIFO 92 until the number of the remaining elements is reduced to zero, and continues to request the transaction controller 62 to issue read request TL packets.

As described above, according to the present embodiment, when a request IU, which is a spanned IU which is divided into a plurality of elements and stored in the IQ, is read from the host 2, the request IU can be obtained with priority over request IUs of the other IQs. Specifically, the read request to the host 2 can be repeatedly made with priority, until all the elements of the number necessary for completing the spanned IU are obtained.

When the remaining elements which have not been transmitted from the host 2 are left in the IQ, the host request processor (medium controller 14) cannot process the request IU being the spanned IU. According to the present embodiment, the remaining elements (elements following the obtained elements) of the spanned IU stored in the IQ can be read with priority over the other elements. Thus, the request IU being a spanned IU is efficiently processed.

When an incomplete spanned IU is read from an IQ of the host 2, a sort of buffer memory to temporarily store a number of incomplete spanned IUs is required. The structure of the present embodiment can suppress generation of incomplete spanned IUs, and thus the capacity of the buffer memory to temporarily store incomplete spanned IUs can be reduced. Specifically, the memory resource on the storage device 1 is reduced to minimum.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interface control apparatus comprising:
an interface configured to transmit information between a host and a data storage apparatus; and
a controller configured to fetch first and second request information that is indicative of a processing request for the data storage apparatus, from elements and a single element through the interface, respectively, the element being a storage unit of a queue provided on the host, the first request information being divided and stored in the elements, and the second request information different from the first request information being stored in the single element, wherein the controller is configured to execute read request processing of fetching a part of the first request information from the elements, and of continuously fetching a remaining of the first request information from the elements with priority over the second request information.

2. An interface controller for an interface between an external host and an external data storage apparatus wherein the external host is externally connected to the interface controller and the external data storage apparatus is externally connected to the interface controller, the interface controller comprising:
a read requester configured to read a first request from two or more elements of a first queue in the external host device and a second request from a single element of a second queue in the external host device,
wherein first request and the second request are indicative of a command for the external data storage apparatus, and
wherein reading the first request from the two or more elements of the first queue is given higher priority than reading the second request from the single element of the second queue.

3. The interface controller of claim 2, wherein
the two or more elements of the first queue respectively store parts of the first request, and
the read requester is configured to continuously read the parts of the first request from the two or more elements of the first queue without reading the second request from the second queue.

4. The interface controller of claim 2, further comprising:
a first buffer memory configured to store read requests to fetch the first request from the first queue;
a second buffer memory configured to store read requests to fetch the second request from the second queue,
wherein the read requester is configured to select the first buffer memory with priority over the second buffer memory, and to transmit a read request to fetch remaining of the first request from remaining elements of the first buffer memory to the external host, when the first buffer memory stores the read request to fetch remaining of the first request.

5. The interface controller of claim 4, wherein
the read requester is configured to continuously transmit the read request stored in the first buffer memory to the external host, until a number of the remaining elements is reduced to zero.

6. A storage apparatus comprising:
a storage medium;
an interface externally connected to an external host; and
a read requester configured to read a first request from two or more elements of a first queue in the external host device and a second request from a single element of a second queue in the external host device,
wherein first request and the second request are indicative of a command for the external data storage apparatus, and
wherein reading the first request from the two or more elements of the first queue is given higher priority than reading the second request from the single element of the second queue.

7. The storage apparatus of claim 6, wherein
the two or more elements of the first queue respectively store parts of the first request, and
the read requester is configured to continuously read the parts of the first request from the two or more elements of the first queue without reading the second request from the second queue.

8. The data storage apparatus of claim 6, further comprising:
a host request processor configured to process the command, based on the first request or the second request obtained in accordance with the read request.

9. The data storage apparatus of claim 6, further comprising:
a first buffer memory configured to store read requests to fetch the first request from the first queue;
a second buffer memory configured to store read requests to fetch the second request from the second queue,
wherein the read requester is configured to select the first buffer memory with priority over the second buffer memory, and to transmit a read request to fetch remaining of the first request from remaining elements of the first buffer memory to the external host, when the first buffer memory stores the read request to fetch remaining of the first request.

10. The data storage apparatus of claim 9, wherein
the read requester is configured to continuously transmit the read request stored in the first buffer memory to the external host, until a number of the remaining elements is reduced to zero.

11. A method of interface between an external host and an external data storage apparatus wherein the external host is externally connected to the interface controller and the external data storage apparatus is externally connected to the interface controller, the method comprising:
reading a first request from two or more elements of a first queue in the external host device and a second request from a single element of a second queue in the external host device,
wherein first request and the second request are indicative of a command for the external data storage apparatus, and
wherein reading the first request from the two or more elements of the first queue is given higher priority than reading the second request from the single element of the second queue.

12. The method of claim 11, wherein
the two or more elements of the first queue respectively store parts of the first request, and
the parts of the first request are continuously read from the two or more elements of the first queue without reading the second request from the second queue.

13. The method of claim 11, further comprising:
selecting a first buffer memory with priority over a second buffer memory, the first buffer memory storing read requests to fetch the first request from the first queue and the second buffer memory storing read requests to fetch the second request from the second queue; and
transmitting a read request to fetch remaining of the first request from remaining elements of the first buffer memory to the external host, when the first buffer memory stores the read request to fetch remaining of the first request.

14. The method of claim 13, further comprising:
continuously transmitting the read request stored in the first buffer memory to the external host, until a number of the remaining elements is reduced to zero.

* * * * *